INVENTORS
Milton D. Scheer
Ralph Klein
BY
ATTORNEYS

United States Patent Office

2,934,578
Patented Apr. 26, 1960

2,934,578

PROCESS FOR LOW TEMPERATURE HYDROGENATION OF OLEFINS

Milton D. Scheer and Ralph Klein, Silver Spring, Md., assignors to the United States of America as represented by the Secretary of Commerce Application February 20, 1959, Serial No. 794,785

6 Claims. (Cl. 260—683.9)

This invention relates to a method and apparatus for the hydrogenation of unsaturated hydrocarbons and more particularly to a process wherein the unsaturated hydrocarbon is maintained at a low temperature and bombarded with hydrogen atoms which combine with the hydrocarbon either in the condensed phase or upon warm-up to yield useful products.

More specifically, the new process of this invention is one in which hydrogen atoms, produced in the gas phase, diffuse and undergo chemical reaction throughout the body of an olefin to produce an alkane. The reaction has been carried out, for example, in a spherical one-liter glass reaction vessel surrounded by a 77° K. bath. As a specific example of this process, butene-1, uniformly condensed on the inner surface of the reaction vessel, is bombarded with hydrogen atoms produced within said vessel on a tungsten ribbon glowing in a hydrogen atmosphere. At the conclusion of the reaction, the products are warmed to room temperature and collected. The reaction products of this specific example were butane, butene-2, and 3,4 dimethyl hexane, an important constituent of high octane fuel.

An object of this invention is to produce free radicals at low temperatures which may in turn react under mild conditions to produce useful results.

Another object of this invention is to produce free radicals that are not subject to high disruptive temperatures and wherein unwanted pyrolysis reactions are avoided.

Still another object of this invention is to provide a process wherein hydrogen atoms are produced in their ground electronic state without the ions and excited molecules usually found in electrical discharges and photolytic experiments.

A further object of this invention is to provide improved means for producing chemical reactions.

A more particular object of this invention is to provide an improved process for the hydrogenation of olefins.

It is a more specific object of this invention to provide a process for the hydrogenation of olefins to produce an alkane.

Other objects and features of the invention will become apparent to those skilled in the art as the disclosure is made in the following detailed description of a preferred embodiment of the invention as illustrated in the accompanying sheets of drawing in which.

Figure 1:
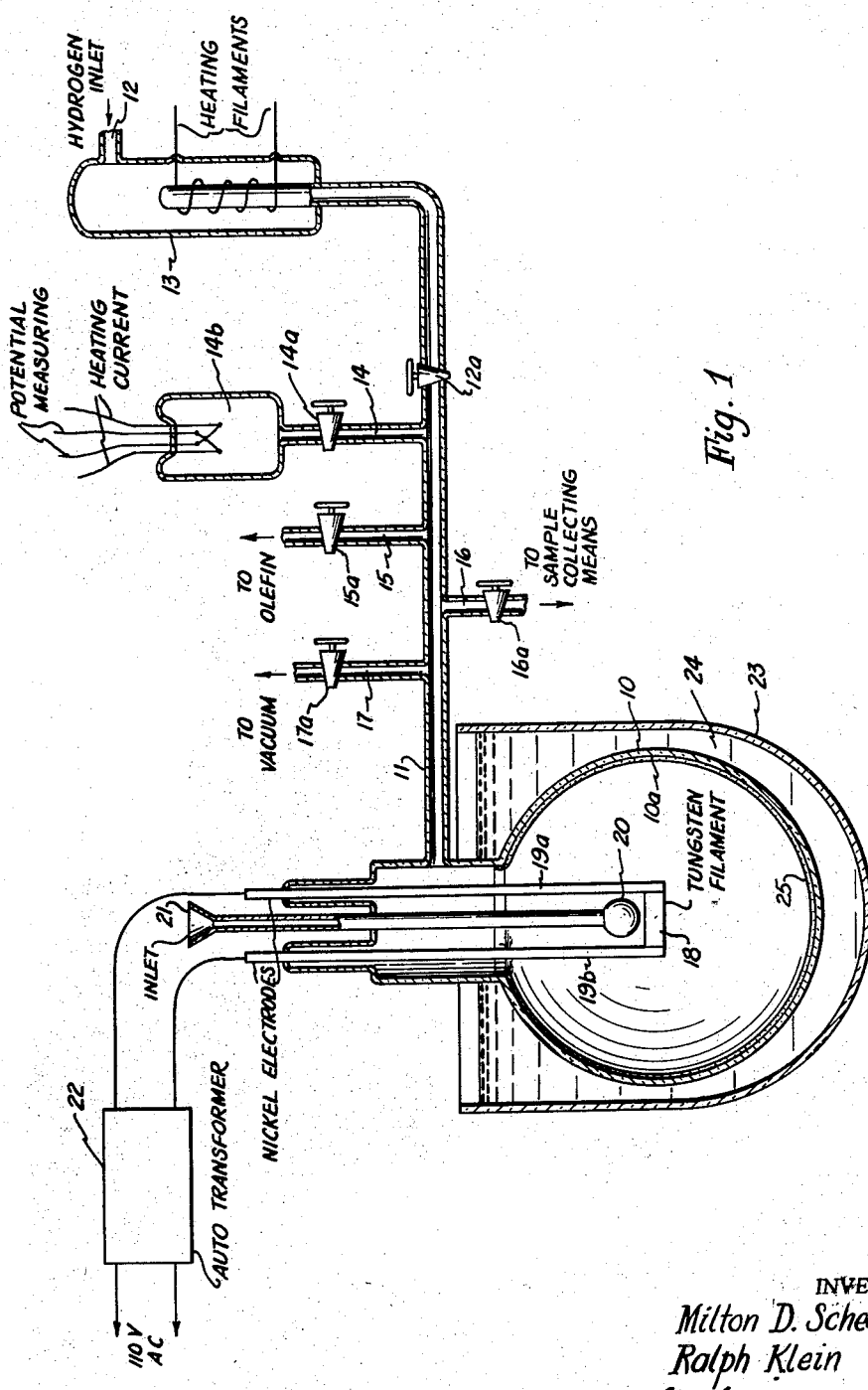
Fig. 1 illustrates a diagrammatic view, in vertical section, of the apparatus of the invention.

Referring now to the drawing, in Fig. 1 reference numeral 10 designates a reaction vessel which suitably may be made of Pyrex glass and which is provided with a conduit 11 through which reactants may be introduced. In one form of the apparatus conduit 11 is provided in the upper portion of vessel 10 and is advantageously made integral with the vessel.

As shown in the drawing, a gas subject to thermal dissociation, such as hydrogen, is introduced into inlet 12 of the conduit from a source of molecular gas such as a commercial gas cylinder (not shown). The gas is purified by slow diffusion through a hot palladium thimble 13 which is made integral with conduit 11 and which operates in a manner well known in the part. A stopcock 12a is provided in conduit 11 whereby the rate of flow of the gas through said conduit to the reaction vessel 10 is controlled.

Conduit 11 has a number of auxiliary conduits 14—17 to which laboratory apparatus may be attached for introducing, metering and analyzing the reaction products of this process.

For example, pressure within the reaction vessel is controlled by adjusting the flow of the feed gas and venting the outgas through auxiliary conduit 14 by means of stopcock 14a to a sensitive thermocouple 14b. The gas transverses the conduit 11 at a pressure of the order of 20 to 100$\mu$ (microns of mercury). Changes of as little as 0.1 micron can be measured by the sensitive thermocouple 14b, overdriven for increased sensitivity and calibrated for hydrogen with a McLeod gauge.

A suitable source of olefin, such as butene-1, propylene, etc., is connected to auxiliary conduit 15 and supplies the reacting species to conduit 11 through stopcock 15a. Likewise, attached to conduit 11 is an auxiliary conduit 16, regulated by stopcock 16a, which connects with suitable sample collecting means whereby the products of the reaction may be collected for analysis.

By means of suitable mechanical or diffusion pumps (not shown) attached to auxiliary conduit 17, all air or other gases are removed from the reaction vessel 10 by reducing the pressure to less than 1 micron of mercury absolute. A stopcock 17a for regulating the suction is incorporated in auxiliary conduit 17.

Enclosed within reaction vessel 10 is a tungsten ribbon 18 (2 cm. x 0.5 cm. x 0.01 cm.) welded to nickel electrodes 19a—19b, respectively. The electrodes are sealed in the upper portion of vessel 10 by Kovar glass seals such as are well known to the art. The metal components are electropolished prior to final assembly. The ribbon is heated electrically and the current is controlled by an auto-transformer 22 operating from a constant voltage source. The temperature of the filament is observed with a conventional micro-optical pyrometer.

Arranged in the central portion of vessel 10 is a 2 cc. bulb 20, suitably constructed of Pyrex glass and containing an inlet 21 outside of the reaction vessel thereby providing an aperture through which a liquid refrigerant may be introduced into said bulb.

To isolate the lower portion of reaction vessel 10 from the ambient temperature, the reaction vessel is enclosed within a conventional Dewar assembly 23, the portion of vessel 10 below the juncture of the conduit 11 is immersed in a bath 24 of liquid nitrogen, or other suitable refrigerant, thereby maintaining the region at 77° K. In a modified version of the invention the liquid nitrogen bath 24 may be insulated from the outside environment by an additional refrigerant bath.

OPERATION

In putting the apparatus into operation, the reaction vessel 10 is sealed off from the source of reduced pressure so that the pressure within the reaction vessel during operation will be due only to the vapor pressure of the reaction products. The olefin is introduced through conduit 15 into the reaction vessel at a pressure of 2 mm.

and condensed on the outer surface of the bulb 20 which is filled with a liquid refrigerant, such as nitrogen. The entire reaction vessel 10 is then immersed in the liquid nitrogen bath 24 and the refrigerant in the bulb 20 evaporated. In this manner a layer of high purity olefin $10^{-5}$ to $10^{-4}$ cm. thick is deposited on the inner surface 10a of the reaction vessel in the form of a reactive film. The thickness of the deposit 25 does not affect the initial rate of hydrogen uptake since no change could be observed even when the olefin layer thickness was increased by a factor of ten. On the other hand, the initial rate of hydrogen uptake is proportional to the concentration of the olefin.

Upon opening stopcock 12a, hydrogen, purified by the hated palladium thimble 13, transverses conduit 11 at pressures from 20 to 100 microns and is dissociated to a combination of atomic hydrogen and activated species in a well-known manner by the tungsten ribbon 18, electrically heated to 1800° to 2000° C. Under these conditions the H atoms reach the inner surface 10a of the reaction vessel without recombining and impinge on the olefin deposit 25 at a rate proportional to the rate at which they are formed by the dissociation of $H_2$ on the hot ribbon. This in turn is governed by the rate of arrival of hydrogen molecules at the ribbon (determined by pressure) and the ribbon temperature. Rates of reaction were followed by recording the pressure drop, pressure measurements being made with the tungsten ribbon at operating temperature. The products of the reaction were then collected through auxiliary conduit 16, fractionated and analyzed. From the products formed, the radical reactions which have occurred can be deduced.

The following examples set forth certain well-defined instances of the application of this invention. In each of these examples, the apparatus illustrated in accompanying Fig. 1 was employed.

*Example 1*

First experiments were done with butene-1. In the gas phase, hydrogen atom addition to butene-1 occurs to give a secondary butyl radical. Principal products obtained after warmup were butane, butene-2 (exclusively trans), and 3,4 dimethyl hexane in the ratio 56:40:4. Small amounts of 3 methyl heptane and n-octane were also found. No butene-1 remained.

The rate of hydrogen uptake by butene-1 as a function of the tungsten ribbon temperature was then measured. The rates were taken as the reciprocal of the time required for the pressure to decrease from 31 to 25 microns, as shown graphically by the Arrhenius plot, Fig. 2.

Associated with this gas phase reaction is an activation energy of approximately 5 kcal., hereinafter to be discussed in detail.

The current interpretation of these results is that initially butyl radicals are formed by the reaction

Subsequently, from Reaction 1

and

These results indicate that H atoms add to the terminal carbon of the primary olefin (butene-1) to give secondary butyl radicals (see Equation 1). 3,4 dimethyl hexane (see Equation 3) results from dimerization of Equation 1 whereas n-butane and butene-2 arise from a disproportionation reaction (Equation 2).

*Example 2*

Using the same operating conditions heretofore described, when using propylene (propene) as the reactive deposit 25 in vessel 10 propyl radicals are obtained which subsequently combine to form 2,3 dimethyl butane. An analysis of the hydrogenation products using a mass spectrometer, wherein the temperature of the tungsten ribbon was maintained at 1500° C., identified the reaction products as propane (37%), propene (58%) and 2,3 dimethylbutane (5%).

Thirty microns of hydrogen react completely with propylene in eight seconds; butene-1 (heretofore described) and isobutene (hereinafter to be discussed) react ⅓ and ¹⁄₂₀ as fast, respectively.

Figure 3:
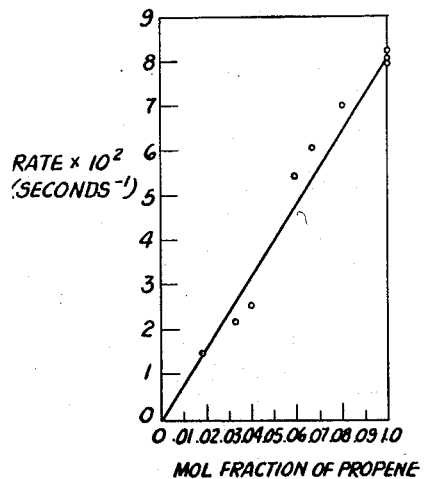
Fig. 3 is a graph of the rate of hydrogen uptake by solid propane as a function of concentration.

Figure 3 illustrates the rate of hydrogen uptake by solid propene as a function of concentration.

If propene is irradiated with deuterium atoms, the occurrence of propane-$d_2$ in the product serves as evidence that the propyl-$d_1$ radical is present in sufficient concentration to be further deuterated. The mass spectrometric analysis of the products of such a reaction showed that the ratio of propane-$d_2$/propane-$d_1$ was approximately 1.

OTHER EXAMPLES

Using the apparatus and procedure described in the foregoing examples, other olefins, such as 3-methylbutene-1, 2-methylbutene-1 and isobutene show rapid hydrogen uptake. Butadiene-1-3, pentene-1 and 3,3 dimethylbutene-1 react very slowly whereas trans-butene-2 and hexene-1 show no measurable reaction. These rate differences are ascribed to small differences in activation energies which readily are observed at these low temperatures.

Figure 4:
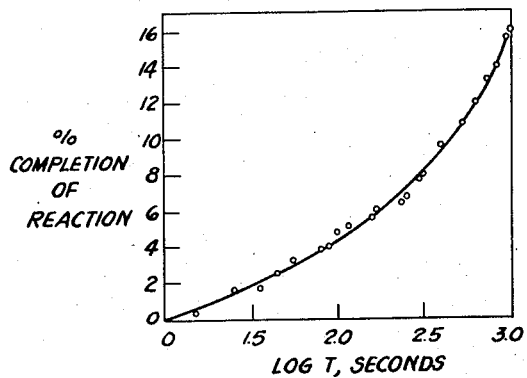
Fig. 4 is a graph illustrating rate data for solid 3-methylbutene-1 hydrogenation.

The course of the reaction with time in terms of hydrogen uptake was determined under conditions of constant atom irradiation for 3-methylbutene-1. The results, plotted as percent completion of reaction versus log of time, are shown in Fig. 4 of the drawings. The reaction is complete when all the 3-methylbutene-1 has been converted to 3-methylbutane. Similar results were obtained for propene (Example 2).

THEORY OF OPERATION

A study of the kinetics of the low-temperature (20° to 150° K.) hydrogen atom addition process gives detailed information concerning the relative reactivities of various olefins. It is found that hydrogen atoms diffuse readily through said hydrocarbons and, in the case of olefins, reaction can occur through the bulk of the solid. At least 80% of the propylene, butene-1 and isobutene, for example, are hydrogenated at liquid nitrogen temperatures whereas hexene-1 does not react.

In a gas-solid reaction of the type described here, there must be two processes involved in the solid-diffusion and chemical reaction. To assess the relative importance of these on the overall rate, measurements were made of the rate of hydrogenation of a layer of propene both with and without a covering layer of propane. Propane was shown to be inert under these conditions by a separate experiment in which the solid was irradiated with D atoms. Neither HD formation, deuterated propane, nor products other than propane were detected with a mass spectrometer. Figure 4 illustrates the initial rate-concentration curve for propene-propane mixtures.

The experimental technique for the preparation of these composite layers was to deposit the olefin on the inner surface of the lower third of the spherical reaction vessel. The second layer was then deposited over the lower half of the vessel. In both cases, this was accomplished by appropriate adjustment of the liquid nitrogen level and rapid introduction of the gas. No decrease in the rate of hydrogen uptake was observed until the inert propane layer was $10^{-4}$ cm. thick, about ten times that of the underlying propene layer. Similar results were obtained if hexene-1 was substituted for propane. It is apparent that H atom diffusion through thin layers of hydrocarbons is rapid and not rate controlling.

Figure 2:
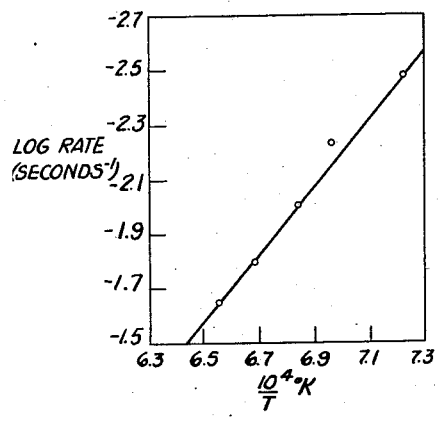
Fig. 2 is an Arrhenius plot of the rate of hydrogen uptake by solid butene-1 as a function of the tungsten ribbon temperature.

The evidence that reaction occurs by H atom addition is conclusive. Three body collisions in the gas phase are unimportant in the pressure region 20 to 100 microns, so that virtually all the H atoms formed at the tungsten ribbon reach the olefin surface. An Arrhenius plot of the rate of reaction for butene-1, as a function of tungsten ribbon temperature is shown in Fig. 2. An activation energy of about 58 kcal. per mole is obtained, and this must arise from the equilibrium dissociation of $H_2$ at the hot filament. The occurrence of propane-$D_1$ in the deuterium plus propene experiment provides further confirmation of an atom mechanism.

The chemical process occurring during irradiation and subsequent warmup of the condensed products can be inferred from the product analysis. H atom addition occurs at the terminal carbon of the primary olefin to form secondary alkyl radicals. These dimerize to form 2,3-dimethylbutane and 3,4-dimethylhexane in the propene and butene-1 hydrogenations, respectively. The propane and n-butane result from an H atom addition to the alkyl radical, and a radical-radical disproportionation reaction. The latter process which may occur either at $-195°$ or at higher temperatures during the warmup process, gives an alkane and an olefin, either butene-1 or butene-2. The butene-2 formed in the hydrogenation of butene-1 may be the product of the disproportionation of two sec-butyl radicals. This would imply that at most about 30% of the butane formed results from the addition of H atoms to sec-butyl radicals. An alternative possibility for the formation of butene-2 is the hydrogen abstraction from sec-butyl radical by an H atom. The deuteration experiment with propene gave deuterated products with a ratio of propane-$d_1$/propane-$d_2$=1. The amount of propane-$d_2$ formed by disproportionation is small compared with that formed by the direct deuteration of the radical. The disproportionation involves abstraction of a primary hydrogen from $$CH_3-CH-CH_2D$$

It is evident that only one propane out of six formed in the reaction would be propane-$d_2$ assuming no isotope effect. In view of these considerations, the propane-$d_1$/propane-$d_2$ ratio equal to 1 implies that about 40% of the propane formed arises from the direct hydrogenation of the propyl radical.

The rate of hydrogen uptake, where the H atom, olefin and alkyl radical concentrations in the solid are in general functions of time and distance from the film surface, is given by $$\frac{-dH_2}{dt}=\int_0^l \left[\frac{k_1}{2}(H)(ol)+\frac{k_2}{2}(H)(R)\right]Adx \quad (2)$$

$(ol)$, $(R)$, $(H)$, $k_1$, $l$ and $A$ are the olefin concentration, radical concentration, H atom concentration, specific reaction rate constants, thickness of the film, and area of the film, respectively. It has been shown that the rate is independent of thickness up to $10^{-4}$ cm. of an inert hydrocarbon layer covering the olefin. The rate of H atom impingement on the surface is much greater than the rate of removal by the olefin, so that H atom recombination occurs in the solid. For the thin olefin films studied, it must be concluded that the H atom concentration throughout the solid is constant. Correspondingly, the concentration of olefin and radical through the film is a function of time only. Then $$\frac{-dH_2}{dt}=K_1(ol)+K_2(R) \quad (3)$$

where $$K_1=\frac{k_1}{2}(H)V$$

and $$K_2=\frac{k_2}{2}(H)V$$

V being the volume of the film. Confirmation of this rate expression is given by the data shown in Fig. 3 where the initial rate of hydrogen pickup is first order with respect to olefin concentration.

It has been implied in Equation 3 that the kinetic mechanism of the reaction is determined by two consecutive reactions. The first is H atom addition to the olefin to form the alkyl radical, and the second is the H atom addition to the radical to form the alkane. This mechanism implies that the alkyl free radicals are matrix stabilized, and can build up in concentration in accordance with the limitations improved by the values of the rate constants of the H atom addition to the olefin and to the alkyl radical. This, of course, ignores possible radical-radical reactions in the solid.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. A process for the hydrogenation of an olefin at low temperatures comprising the steps of condensing an olefin in a low temperature region of between 20° and 150° K., subjecting hydrogen to thermal dissociation, passing the products of said dissociation into said low temperature region and allowing the reaction products to warm to room temperature.

2. A process for the hydrogenation of an olefin comprising the steps of condensing an olefin in a low temperature region of 20° to 150° K., subjecting molecular hydrogen gas at ambient temperature to thermal dissociation, passing the products of said dissociation into the low temperature region to react with the olefin and allowing the reaction products to gradually warm to ambient temperature.

3. A process of hydrogenating an olefin at low temperatures which comprises the steps of subjecting hydrogen atoms produced in the gas phase into a low temperature region of 20° to 150° K., reacting said atoms with the solid surface of an olefin, allowing the reaction products to warm to room temperature and collecting the products of the reaction.

4. A method for the low temperature hydrogenation of an olefin comprising the steps of reacting atomic hydrogen with the solid surface of an olefin at a temperature of between 20° and 150° K. and warming the reaction products to room temperature.

5. A method for the hydrogenation of butene-1 comprising the steps of passing butene-1 into a low temperature region of 20° to 150° K., bombarding said butene-1 with hydrogen atoms produced by the thermal dissociation of molecular hydrogen and allowing the products to be warmed to ambient temperature.

6. A process for the hydrogenation of an olefin selected from the group consisting of butene-1, propene, 3-methylbutene-1, 2-methylbutene-1 and isobutene comprising the steps of purifying molecular hydrogen, dissociating said molecular hydrogen thermally, bombarding said olefin with the products of said dissociation, while maintaining said olefin at a temperature of 20° to 150° K. and at a pressure of 20 to 100 microns Hg absolute.

References Cited in the file of this patent

UNITED STATES PATENTS

| | | |
|---|---|---|
| 1,979,976 | Marshall | Nov. 6, 1934 |
| 2,037,712 | Frankforter et al. | Apr. 21, 1936 |
| 2,167,471 | Auerbach | July 25, 1939 |
| 2,174,923 | Tabino | Oct. 3, 1939 |